(12) United States Patent
Eberl et al.

(10) Patent No.: US 10,900,932 B2
(45) Date of Patent: Jan. 26, 2021

(54) PHOTOACOUSTIC SENSOR, METHOD FOR CHECKING A GAS-TIGHTNESS, AND SYSTEM

(71) Applicant: Infineon Technologies AG, Neubiberg (DE)

(72) Inventors: Matthias Eberl, Taufkirchen (DE); Franz Jost, Stuttgart (DE); Stefan Kolb, Unterschleissheim (DE)

(73) Assignee: Infineon Technologies AG, Neubiberg (DE)

( * ) Notice: Subject to any disclaimer, the term of this patent is extended or adjusted under 35 U.S.C. 154(b) by 148 days.

(21) Appl. No.: 16/203,859

(22) Filed: Nov. 29, 2018

(65) Prior Publication Data

US 2019/0170702 A1 Jun. 6, 2019

(30) Foreign Application Priority Data

Dec. 1, 2017 (DE) ........................ 10 2017 128 526

(51) Int. Cl.
*G01N 29/24* (2006.01)
*G01N 29/32* (2006.01)
*G01N 21/17* (2006.01)

(52) U.S. Cl.
CPC ..... *G01N 29/2431* (2013.01); *G01N 21/1702* (2013.01); *G01N 29/2418* (2013.01); *G01N 29/2425* (2013.01); *G01N 29/326* (2013.01); *G01N 2021/1704* (2013.01); *G01N 2021/1708* (2013.01)

(58) Field of Classification Search
CPC ............ G01N 29/2418; G01N 29/2425; G01N 29/2431; G01N 21/1702; G01N 21/1704; G01N 21/1708
See application file for complete search history.

(56) References Cited

U.S. PATENT DOCUMENTS

| 4,457,162 A | 7/1984 | Rush et al. |
| 5,841,017 A * | 11/1998 | Baraket .............. G01N 21/1702 73/1.59 |
| 2009/0266144 A1* | 10/2009 | Rezachek .......... G01N 21/1702 73/24.02 |

FOREIGN PATENT DOCUMENTS

| CN | 102016547 A | 4/2011 |
| CN | 102345495 A | 2/2012 |
| CN | 102519904 A | 6/2012 |
| CN | 106769973 A | 5/2017 |
| WO | WO 2010/145892 A1 | 12/2010 |

* cited by examiner

*Primary Examiner* — Paul M. West
(74) *Attorney, Agent, or Firm* — Harrity & Harrity, LLP

(57) ABSTRACT

An example of a system comprises a volume filled with a gas, a gas excitation device configured to excite the gas inside the volume, a microphone configured to output a microphone signal on the basis of the gas excited by the gas excitation device, and a testing unit configured to take the microphone signal as a basis for testing a gas-tightness of the volume. An example of a photoacoustic sensor comprises a hermetically sealed sensor cell, a gas excitation device and a testing unit configured to take the microphone signal dependent on the thermally excited gas as a basis for testing a gas-tightness of the sensor cell. One example comprises a method for testing a gas-tightness of a volume filled with a gas.

20 Claims, 3 Drawing Sheets

PHOTOACOUSTIC SENSOR, METHOD FOR CHECKING A GAS-TIGHTNESS, AND SYSTEM

RELATED APPLICATION

This application claims priority under 35 U.S.C. § 119 to German Patent Application No. 102017128526.1, filed on Dec. 1, 2017, the content of which is incorporated by reference herein in its entirety.

TECHNICAL FIELD

Example embodiments concern a photoacoustic sensor and a method for testing a gas-tightness of a volume.

BACKGROUND

Technical applications are known in which a predetermined space or a predetermined cell may be required to be gas-tight. Similarly, test methods are known that can be used to ascertain a gas-tightness of this kind. This can involve for example a leak test being performed by virtue of what is known as a sniffer probe being guided along seals and possibly leaky points on an object under test filled with a gas and at overpressure. If the overpressure then results in a gas escaping from the object under test, this can be ascertained by the sniffer probe, which means that it is ascertained that the object under test is not gas-tight or the object under test is not guaranteed to be regularly gas-tight. Such a test may be uneconomical for certain applications, however, or impossible on account of technical constraints.

Objects under test having regularly gas-tight volumes, spaces or cells may be, by way of example, components of electronic equipment from various fields, such as, for example, medical equipment or equipment used in the automotive sector or end-user sector with vacuum chambers or chambers filled with a particular gas or sensors. By way of example, computer hard disks may be filled with a helium gas or sensor chambers may be filled with any predetermined gas. A sensor system having a gas chamber that should be regularly gas-tight relative to the surroundings is a photoacoustic sensor, for example.

A photoacoustic sensor of this kind can be used to quantitatively determine a concentration of a gas on a measurement section. To this end, a light source can send a light signal having at least one wavelength, predetermined on the basis of the gas to be determined, or an applicable spectral component into a sensor cell of the photoacoustic sensor via the measurement section. On the basis of the concentration of the gas on the measurement section, a portion of the light signal can be absorbed at that location, while a remaining portion of the light signal can enter the sensor cell. The sensor cell may be filled with the respective gas whose concentration is to be determined on the measurement section. The gas inside the sensor cell can absorb the remaining portion of the light signal of the predetermined wavelength, as a result of which an energy state of the gas can increase or this gas can be excited. The higher the concentration of the gas on the measurement section, the smaller the remaining portion of the light signal that can excite the gas inside the sensor cell.

When the gas is excited, the pressure thereof changes, which means that a particular pressure increase occurs inside the sensor cell depending on the excitation. This pressure increase can be detected as a sound signal by a microphone having suitable sensitivity inside the sensor cell and can be converted into a corresponding microphone signal. As a result of evaluation of an intensity or an amplitude of the microphone signal generated by the gas excited by the light signal that enters the sensor cell, the concentration of the gas on the measurement section is ascertainable, since the respective excitation of the gas is dependent on this concentration. At a gas concentration of zero on the measurement section, approximately the entire light signal can be absorbed by the gas inside the sensor cell, and the microphone signal has a full intensity or maximum amplitude. The higher the concentration of the gas on the measurement section, the larger the portion of the light signal that is absorbed on the measurement section. The remaining portion of the light signal, which enters the sensor cell, is correspondingly smaller. As a consequence, the increase in the energy state of the gas or the excitation and therefore the pressure change inside the sensor cell and hence the intensity or amplitude of the resultant microphone signal are also smaller.

In order to prevent an exchange of gas between the predetermined gas of the sensor cell and the surroundings of the sensor cell, sensor cells may be gas-tight or hermetically sealed, that is to say sealed such that no exchange of gas takes place with surroundings. They can be gas-tight so long as there is no defect. A configuration of this kind is referred to as regularly gas-tight. The intact seal of the sensor cell can be tested in a test during production of a respective sensor cell. The small physical size of, by way of example, photoacoustic sensors means that test methods using, by way of example, a helium leak detector for testing the seal or a defective seal or leak are sometimes difficult and/or cost-intensive, however. These facts described purely by way of example on the basis of a photoacoustic sensor can also arise on any other systems that require a particular volume to be gas-tight.

SUMMARY

There is the need to provide a way of allowing a gas-tightness of a volume to be tested inexpensively and reliably.

One example embodiment concerns a system comprising a volume filled with a gas. The system additionally comprises a gas excitation device configured to excite the gas inside the volume and a microphone configured to output a microphone signal on the basis of the gas excited by the gas excitation device. A testing unit is configured to take the microphone signal as a basis for testing a gas-tightness of the volume.

The volume may thus be regularly gas-tight, which means that it is gas-tight in a functioning state or intact state, meaning that no gas can escape from the volume or enter the volume. However, an error or a defect may mean that it is possible for the regularly gas-tight volume to be de facto leaky, which means that an exchange of gas between the gas in the volume and the surroundings may be possible. The testing unit can test whether the volume is intact, that is to say gas-tight, or whether it has a defect and has therefore become leaky.

The testing unit can test the gas-tightness of the volume on the basis of the microphone signal output when the gas is excited by the gas excitation device. In this case, it may be possible for a first gas to be regularly arranged in the volume and a second gas to be arranged outside the volume. If the first gas is excited, a first microphone signal can be output that corresponds to the first gas. If the first microphone signal is output in surroundings having a second gas, this suggests that the volume is gas-tight or intact, since otherwise an exchange of gas with the surroundings would take place and thus the second gas could enter the volume. In such a case, a second microphone signal differing from the first microphone signal would be output, said second microphone signal possibly corresponding to the second gas, for example. A second microphone signal differing from the first microphone signal thus suggests that the volume is not gas-tight or is leaky or is defective.

Various types of excitation are possible, for example thermal, acoustic or optical excitation. Depending on the gas with which the volume is filled, a corresponding microphone signal dependent on the respective gas is generated. Thus, the microphone signal can be taken as a basis for evaluating or testing whether the volume contains that gas which is used to fill the volume or with which the volume is filled regularly or in a predetermined state. In this manner, the gas-tightness of the volume can be tested, since in the event of a defective seal an exchange of gas between the gas in the volume and an ambient gas can take place and, as a result, the microphone signal generated by the ambient gas can differ from the microphone signal that corresponds to the gas in the volume. This can result in a functionality of such a system being able to be tested at any time and without needing or having to connect additional test equipment, in particular as a result of the gas excitation device being positioned inside the volume. It may therefore be possible to obtain certainty about a functionality at any time or, in the event of a defect, for said defect to be indicated, for example.

One example embodiment relates to a system wherein the volume filled with the gas is a regularly hermetically sealed space. This results in an exchange of gas with the surroundings not being possible in a regular state. The gas excitation device may be arranged inside the volume, so that it can excite the gas inside the regularly hermetically sealed space directly and independently of a location of the volume, for example. The gas excitation device can then comprise a heating apparatus, with the effect that the gas can be thermally excited. Accordingly, a gas excitation device may be configured to thermally excite the gas, which means that the microphone signal is output on the basis of a thermoacoustic property of the gas. One effect may be that the gas-tightness of the volume can be reliably tested on the basis of the thermoacoustic effect. The gas excitation device can comprise an electrical resistor element heatable, in order to excite the gas, by applying a predetermined electrical signal. The electrical resistor element can comprise at least a portion of a temperature sensor inside the volume. The advantage in this case may be that a temperature sensor of this kind can thereby have a dual functionality and therefore the system has an efficient design. The temperature sensor may be a PTC temperature sensor or PT1000 temperature sensor, for example. A temperature sensor of this kind can have particular long-term stability, which means that the system can reliably test a gas-tightness even after a long operating period.

A further example embodiment relates to a system as described wherein the gas excitation device comprises a photodiode able to have a predetermined electrical signal applied, in order to thermally excite the gas in the volume. The advantage in this case may be that a photodiode of this kind may already be present in the system for another function and can therefore be used efficiently for a further function, namely as a gas excitation device. In this case, an electrical conductivity of an element of the photodiode can be utilized. The predetermined electrical signal can have a predetermined voltage and/or a predetermined frequency and/or a predetermined duty cycle. As a result, the signal can advantageously be individually matched to a respective gas excitation device, a respective system and/or a respective gas.

One example embodiment relates to a system in which the testing unit has a reference signal that is a microphone signal generated in a predetermined calibration situation by the gas excited by the gas excitation device of a gas-tight volume. As a result, a reference signal can be determined very accurately and at the same time easily. The testing unit can comprise an output unit configured so as, in the event of the microphone signal being within a predetermined tolerance range around the reference signal, to output a signal with a piece of information indicating that the volume (102) is gas-tight. The predetermined tolerance range may be consistent with an amplitude range that comprises a predetermined difference in the amplitude of the reference signal. The predetermined difference can comprise 10% and the tolerance range is consistent with an amplitude range in which the amplitudes are between 90 percent and 110 percent of the amplitude of the reference signal. Advantageously, the predetermined difference can also have, depending on the system, a value of between 2% and 30%, for example, depending on the surroundings in which the system is used, for example, and/or which gas is inside the volume. One example embodiment relates to a system wherein the testing unit comprises an output unit configured so as, in the event of the microphone signal being within a predetermined error range excluding the reference signal, to output a signal with a piece of information indicating that the volume is leaky. Said output unit may also be configured so as, in the event of a change in the microphone signal over time being greater than a predetermined error value, to output a signal with a piece of information indicating that the volume is leaky. The advantage in this case may be that a gas leak can be detected even before the tolerance range is exceeded or undershot. One example embodiment relates to a system wherein the testing unit comprises an output unit configured so as, in the event of the microphone signal being within a predetermined zero range, to output a signal with a piece of information indicating that the microphone and/or a microphone signal processing unit of the system is/are defective. The advantage may be that, besides a gas leak test, a test for other components of the system may also be provided.

A further example embodiment relates to a system wherein the testing unit comprises a signal output configured to output a signal causing the gas to be excited by the gas excitation device. The signal may be an activation signal or the electrical signal that can be applied to the gas excitation device. This can result in the advantage that the testing unit can perform a test independently. By way of example, according to the example embodiment, a test can take place regularly, for example once a day, once an hour or once a week, and/or can also be performed more frequently depending on the situation, for example if the testing unit finds an irregularity in the operation of the system, for example if a change in the microphone signal over time is greater than a predetermined error value. In such a case, a gas leak that can cause an excessive change in the system (for example if the microphone signal exceeds the tolerance range), for example, can be detected particularly quickly. A further example embodiment relates to a testing unit of this kind having a signal output, wherein the testing unit is configured to be used on a system and/or photoacoustic sensor.

A further example embodiment concerns a photoacoustic sensor. The photoacoustic sensor comprises a hermetically sealed sensor cell filled with a gas, an optical emitter, arranged outside the sensor cell, configured to optically (photonically) excite the gas, a microphone configured to output a microphone signal on the basis of the excited gas, a gas excitation device inside the sensor cell, configured to thermally excite the gas, and a testing unit configured to take the microphone signal dependent on the thermally excited gas as a basis for testing a gas-tightness of the sensor cell.

The sensor cell or an interior of the sensor cell may be regularly filled with a first gas, which means that the photoacoustic sensor may measure a concentration of the first gas on a measurement section by means of the optical emitter. As a result of the sensor cell being hermetically sealed, it may be gas-tight in an intact state. By contrast, a light signal can regularly enter the hermetically sealed sensor cell. The optical emitter is therefore configured to direct a light beam onto the sensor cell or to illuminate or irradiate the sensor cell with a light beam. The testing unit can be used independently of the optical emitter to test whether the first gas is actually inside the sensor cell, which means that it is possible to test whether the sensor cell is gas-tight or intact. To this end, the gas excitation device can excite the gas in the sensor cell, which means that a microphone can output a corresponding microphone signal. To excite the gas, the gas excitation device can have a predetermined electrical signal applied. If the sensor cell is arranged in surroundings with a second gas and the output microphone signal corresponds to the first gas, it can be concluded that the sensor cell is gas-tight, since no exchange of gas between the sensor cell and the surroundings takes place or can take place. The microphone signal corresponding to a gas can be obtained by means of calibration of said sensor cell or of a sensor cell of the same design, for example.

In this manner, the system or the photoacoustic sensor can easily and inexpensively check whether there is a particular gas in the volume or in the sensor cell of the photoacoustic sensor, as a result of which a gas-tightness or an intact seal can be inferred, or whether there is another gas therein, as a result of which a defective seal or a gas leak can be inferred.

A further example embodiment concerns a method for testing a gas-tightness of a volume filled with a gas. The method comprises exciting the gas inside the volume by means of a gas excitation device, capturing a microphone signal on the basis of the excited gas by means of a microphone and testing the gas-tightness of the volume on the basis of the microphone signal.

The method allows simple and inexpensive means to be used to test whether there is a predetermined gas inside the volume. The method can be applied to any volumes or gas/vacuum chambers or gas-tight cells to this end. It is possible for an electrically conductive element already present in a volume to be used as a gas excitation device in a particularly efficient manner as a result of the element being heated by applying an electrical signal, so that the gas can be excited.

BRIEF DESCRIPTION OF THE FIGURES

A few examples of apparatuses and/or methods are explained in more detail below merely by way of example with reference to the accompanying figures, in which.

DESCRIPTION

Various examples are now described more thoroughly with reference to the accompanying figures, which depict a few examples. The thicknesses of lines, layers and/or regions in the figures may be exaggerated for clarification purposes.

While further examples are suitable for various modifications and alternative forms, some specific examples thereof are accordingly shown in the figures and are described thoroughly below. However, this detailed description does not restrict further examples to the specific forms described. Further examples can cover all modifications, counterparts and alternatives that fall within the scope of the disclosure. Throughout the description of the figures, identical reference signs refer to identical or similar elements which can be implemented identically or in modified form in comparison with one another, while they provide the same or a similar function.

It goes without saying that if one element is referred to as "connected" or "coupled" to another element, the elements can be connected or coupled directly or via one or more intermediate elements. If two elements A and B are coupled using an "or", this should be understood such that all possible combinations are disclosed, i.e. only A, only B, and A and B. An alternative wording for the same combinations is "at least one of A and B". The same applies to combinations of more than two elements.

The terminology used here to describe specific examples is not intended to have a limiting effect for further examples. When a singular form, e.g. "a, an" and "the" is used, and the use of only a single element is defined neither explicitly or implicitly as obligatory, further examples can also use plural elements in order to implement the same function. If a function is described below as implemented using a plurality of elements, further examples can implement the same function using a single element or a single processing entity. Furthermore, it goes without saying that the terms "comprises", "comprising", "has" and/or "having" in their usage specify the presence of the indicated figures, integers, steps, operations, processes, elements, components and/or a group thereof, but do not exclude the presence or addition of one or more other features, integers, steps, operations, processes, elements, components and/or a group thereof.

Unless defined otherwise, all terms (including technical and scientific terms) are used here in their customary meaning in the field with which examples are associated.

Figure 1:
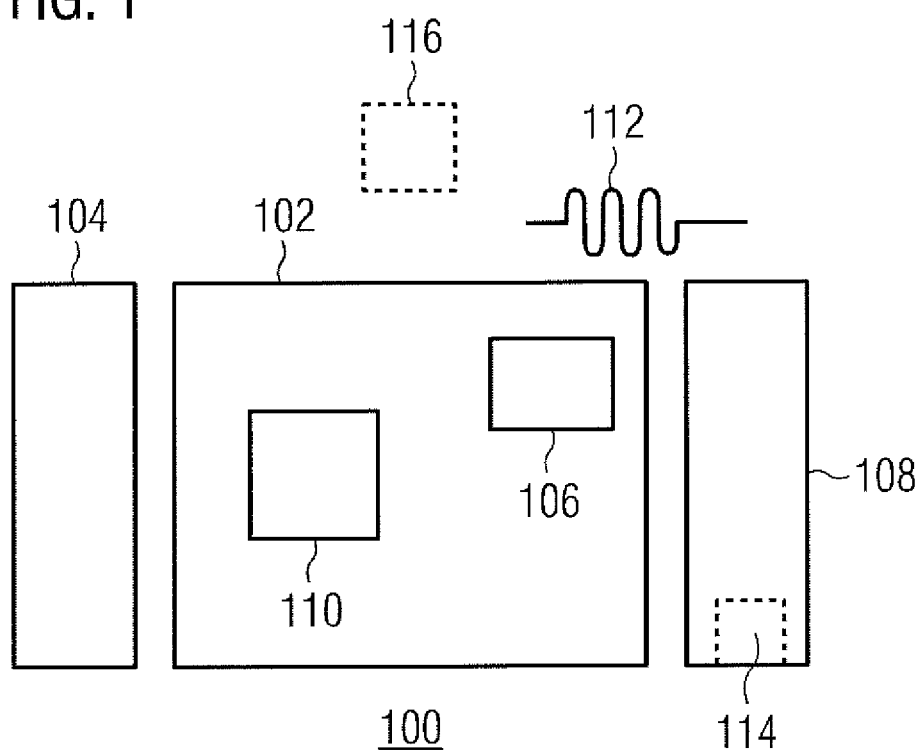
FIG. 1 shows an example embodiment of a system.

FIG. 1 shows an example embodiment of a system 100 comprising a volume 102, a gas excitation device 104, a microphone 106 and a testing unit 108. The volume 102 is filled with a gas 110 and the gas excitation device 104 is configured to excite the gas 110 inside the volume 102. The microphone 106 is configured to output a microphone signal 112 on the basis of the gas 110 excited by the gas excitation device 104. The testing unit 108 is configured to take the microphone signal 112 as a basis for testing a gas-tightness of the volume 102. The testing unit 108 can optionally have a signal output 114. Further, it may be possible for at least part of the volume 102 to be surrounded by an ambient gas 116.

In one example embodiment, the volume 102 is filled with the gas 110. To this end, the volume 102 has been filled with the gas 110 during production, for example. In the example embodiment, the volume 102 or the whole system 100 is in surroundings with the ambient gas 116, which is different than the gas 110. There may be provision for the volume 102 to be embodied in gas-tight fashion, which means that an exchange of gas between the gas 110 and the ambient gas 116 is prevented in a regular case or when the volume is intact. The gas-tight volume may sometimes have a defect, however, which means that ambient gas 116 can nevertheless enter the volume 102 and the gas 110 can escape from the volume 102. The testing unit 108 can detect a gas-tightness when the volume 102 is intact, that is to say that no exchange of gas can take place. To this end, the testing unit 108 may be configured to evaluate the microphone signal 112 or multiple microphone signals 112 received in succession.

In the example embodiment, the gas excitation device 104 is in contact with the gas 110 such that the gas 110 can be excited by the gas excitation device. This means that the gas 110 can be excited such that the microphone 106 can output the microphone signal 112. The excitation can thus cause a movement or a vibration by the gas 110 as a result of an energy change in the gas 110, said movement or vibration being able to be detected by the microphone 106 as an audible signal. In this case, the microphone 106 may be in contact with the gas 110 inside the volume 102 or may be configured at least partly inside the volume 102.

Examples of the excitation can comprise an optical excitation, a thermal excitation or an acoustic excitation. It is also possible to excite the gas 110 from outside the volume, for example optically, with a light signal being able to enter the regularly gas-tight volume through a window in order to excite the gas 110.

In one example embodiment, the microphone 106 may be connected directly to the testing unit 108 in order to transmit the microphone signal 112 thereto. The microphone signal 112 can also be received by another portion of the system 100 and made available to the testing unit 108. In one example embodiment, the testing unit 108 may be mechanically connected or coupled to the volume 102. In further example embodiments, the testing unit 108 may be integrated in the volume 102. It is possible for the testing unit 108 to be concentrated or to be integrated in a block or a self-contained unit in the volume 102. It is likewise possible for various elements that the testing unit 108 can comprise to be distributed in the volume 102 or in the system 100.

A testing unit 108 may also be configured such that it can be connected to various volumes. A testing unit 108 of this kind may be configured as a separate or single element such that it can be added to already existing volumes that can comprise a microphone and a gas excitation device. Therefore, any volumes can be tested for gas-tightness by means of the testing unit.

As already mentioned, the testing unit 108 tests the gas-tightness of the volume 102 on the basis of the microphone signal 112. This utilizes the fact that different gases cause different microphone signals when excited by the gas excitation device 104 in the same manner. The testing unit 108 may be provided with the microphone signal 112, generated when the gas 110 in a gas-tight volume is excited, for comparison, for example. A microphone signal of this kind can be referred to as a test signal or reference signal. If the volume 102 is gas-tight or intact, exclusively the gas 110 can be found inside the volume 102, even if the volume 102 is surrounded by the ambient gas 116.

If the gas excitation device 104 now excites the gas 110 during a measurement of an intact volume, the testing unit 108 receives the microphone signal 112 that it would expect when the microphone signal 112 is generated exclusively by the gas 110. Since the microphone signal 112 received in this manner corresponds to the gas 110, the testing unit 108 can conclude that said gas is inside the volume and therefore that the volume 102 is gas-tight. Testing on the basis of the microphone signal 112 can thus mean that the testing unit 108 expects a particular microphone signal 112 and, if it receives a microphone signal that differs from the particular microphone signal 112, can conclude that the volume 102 is not gas-tight or is no longer gas-tight.

In another example embodiment, the microphone signal 112 differs from the expected microphone signal that corresponds to the gas 110. From this, it is possible to conclude that a gas that differs from the gas 110 is inside the volume 102. In this case, it is possible to conclude that the volume is leaky or its seal is defective, which means that an exchange of gas between the gas 110 in the volume 102 and the ambient gas 116, for example, can take place, since the gas 110 is therefore no longer in the volume. In this case, at least part of the microphone signal that is then output can correspond to the ambient gas 116. The defective seal means that the gas 110 may have escaped from the volume and the ambient gas 116 may have entered the volume. A leaky volume can also be referred to as a volume with a defective seal or as a defective volume.

Since a composition of the ambient gas 116 can change over a certain time, for example as a result of different surroundings in which the system 100 is positioned, the microphone signal 112 can differ on the basis of the respective ambient gas 116 in each case, as a result of different ambient gases 116 being able to enter the volume 102 when the volume 102 is leaky. If the microphone signal 112 in such a situation thus differs in respective different measurements recorded in temporal succession by the microphone 106, it is possible to conclude therefrom, possibly even without a reference signal, that the volume 102 is defective and a gas-tightness of the volume 102 is not ensured. In the opposite case, if the respective microphone signals 112 remain constant for different respective ambient gases given multiple microphone signals 112 recorded in temporal succession, it can be concluded that the volume 102 is gas-tight, since a composition of the gas 110 inside the volume does not change if said volume is gas-tight.

Figure 2:
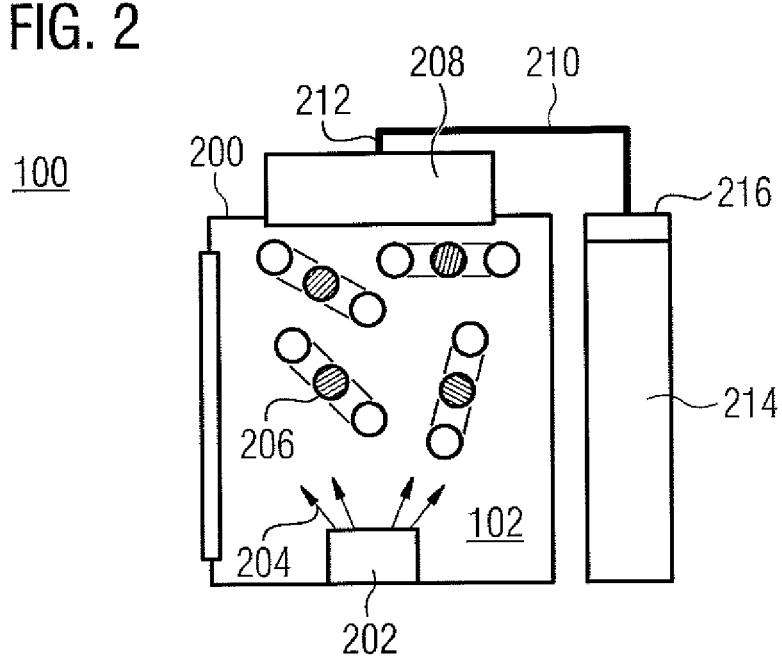
FIG. 2 shows an example embodiment of a system having a volume, a microphone and a gas excitation device inside the volume.

FIG. 2 depicts a further example embodiment of the system 100 in which the volume 102 is a hermetically sealed space 200. A gas excitation device 202 is arranged inside the hermetically sealed space 200 and configured to bring about excitation 204 of a gas 206 with which the space 200 is filled. The gas 206, for example carbon dioxide, can be excited or put into an excited state by the gas excitation device 202, in other words. A microphone 208 is arranged inside the space 200 such that the excited gas 206 can cause a microphone signal 210 to be able to be output at a microphone output 212. The microphone 208 can have a high sensitivity and, in this regard, may be provided as a MEMS (microelectromechanical system) microphone, for example, which has sufficient sensitivity for detecting applicable pressure differences that can arise when the gas 206 is excited 204.

If the gas 206 is excited periodically by the gas excitation device 202, for example, it expands periodically, resulting in a microphone signal 210 at the frequency of the periodic excitation. In this case, by way of example, an amplitude 214 of the microphone signal 210 is dependent on the gas 206 and on the strength of the excitation, since the gas 206 is taken as a basis for outputting in each case a particular microphone signal 210 upon excitation 204. The amplitude 214, schematically depicted as a bar chart in FIG. 2, may be the amplitude of a microphone signal having an amplitude value 216, for example, in one example embodiment. In this case, an amplitude value can correspond to the gas 206, which means that it is possible to conclude that the hermetically sealed space 200 is intact, that is to say is gas-tight. In another example embodiment, the microphone signal 210 can have a corresponding amplitude value 218 that does not correspond to the gas 206. From this, it is possible to conclude that the space 200 is leaky, since the gas 206 has been able to escape and thus no longer fills the space 200. Other characteristics of the microphone signal may also be a phase or a frequency spectrum, which are able to be used for evaluation or for comparison with a reference signal.

A regularly hermetically sealed space can mean a space that is hermetically sealed in a regular case or normally. Hermetically sealed can mean in particular that the space is hermetically sealed in regard to a possible exchange of gas, which means that an exchange of gas is not possible. It may be possible for the hermetically sealed space just to prevent an exchange of gas with the surroundings, but to permit light to enter the hermetically sealed space through a boundary of the space, for example. By way of example, a lateral wall of the hermetically sealed space may be of transparent design, which means that it is translucent but at the same time is gas-tight.

In one example embodiment, the gas excitation device 202 may be arranged inside the volume such that it is arranged entirely inside the volume. A gas excitation device of this kind can be actuated from outside the volume via a signal line routed into the volume for example. In another example embodiment, part of the gas excitation device 202 may also be arranged inside the volume, which means that it can firstly excite the gas 206 and secondly has a signal input or a signal output that is outside the volume. A gas excitation device 202 of this kind arranged inside the volume allows testing of the gas-tightness of the volume to be performed independently of an external gas excitation device, in particular at any time and independently of external test equipment. Arranging the gas excitation device inside the volume allows external sources of error when testing the gas-tightness to be precluded. It is also possible for autonomous testing for gas-tightness of the volume of the system to be provided by the system itself. In some example embodiments, integrating the gas excitation device inside the volume can avoid physically enlarging the system and at the same time allow a gas-tightness of the volume to be tested. Therefore, the arrangement of the gas excitation device inside the volume allows an efficiency of the system to be increased.

In a further example embodiment, the gas excitation device 104 comprises a heating apparatus. A heating apparatus of this kind can be heated based on an actuation signal, for example. To this end, a heating coil or an electrical resistor can have an electric current applied, for example, so that at least a portion of the heating apparatus heats up. The portion of the heating apparatus that is heatable may be arranged inside the volume in this case such that a heat transfer to the gas inside the volume is enabled. The heating apparatus may be configured as a controllable heat source or active heat source, for example, that can be activated by an information signal to deliver a heat output. If the volume is bounded by lateral elements that are electrically conductive, it may be that the heating apparatus is provided by a lateral element of this kind. It may also be that electrically conductive elements present inside the volume are provided as a heating apparatus. Therefore, for example, elements that can primarily have a first function, for example can contribute to temperature measurement, may be provided, and used, as a heating apparatus in a second function. As a result, it may be possible for no additional heating apparatus to need to be integrated into the volume.

In a further example embodiment, the gas excitation device 202 is configured to thermally excite the gas 206, this being possible by means of a heating apparatus as already described. By way of example, the gas excitation device 104 is heated, which also heats the gas 206 by means of heat transfer or convection. In this case, the gas 206 can have particular thermoacoustic properties, i.e. can have a characteristic acoustic reaction depending on the thermal excitation. When the gas 206 is heated in a particular way, a particular acoustic response or a particular expansion of the gas 206 is therefore obtained. This can particularly differ from a thermoacoustic property of another gas, for example ambient gas. An ambient gas may be a gas mixture in many cases, which means that the gas mixture can enter the cavity or the volume in the event of a leak. On account of the thermoacoustic effect, a thermal excitation 204 of the gas 206 results in a microphone signal 210 being output that, on the basis of its characteristic, can be associated with the gas 206 in each case. Thus, if a microphone signal 210 is output that can be or is associated with the gas 206, it is possible to conclude that an exchange of gas between the gas 206 and an ambient gas is not possible, that is to say that the hermetically sealed space 200 is intact and is therefore gas-tight. If a microphone signal 210 is output that does not correspond to the thermoacoustic properties of the gas 206, on the other hand, then it can be concluded that the hermetically sealed space 200 is leaky or defective.

In one example embodiment, the gas excitation device 202 comprises an electrical resistor element configured to excite the gas 206 inside the hermetically sealed space 200 or the volume 102 when said gas excitation device has a predetermined electrical signal applied. The electrical signal can thus heat the gas excitation device 202, for example, which means that the gas 206 also heats up and this can trigger a thermoacoustic effect. The electrical resistor element can have an electrical signal applied, which means that, once heated, it can excite the gas 204 and therefore bring about the microphone signal 210. An electrical resistor element may be inexpensive in this case and its temperature increase, which can be used for convection or heat transfer, can easily be determined by the applied electrical signal. An electrical resistor element can in particular also be configured to have a small volume, which means that it is intractable into existing volumes. It is possible to use an electrical resistor element of this kind that is already present in a volume and otherwise provides another function necessary for the volume. Therefore, a component that is present can be used in dual fashion and a gas excitation device 202 as an additional component can be dispensed with. A dual functionality of this kind for a single component may be able to result solely from the gas excitation device being able to thermally excite the gas and a thermoacoustic effect being used to test the gas-tightness.

In a further example embodiment, an already present resistor element of this kind comprises at least a portion of a temperature sensor inside the hermetically sealed space 200 or volume 102. A temperature sensor of this kind can be used in one mode of operation in order to ascertain a temperature, for example in order to compensate for an ambient temperature or base temperature of the gas 206 in a measurement result from a sensor or photoacoustic sensor. A temperature sensor of this kind can comprise an electrical resistor element. One or more resistor elements of this kind that can detect a temperature in a first mode can have an electrical signal applied in a second mode such that they can heat up and are able to thermally excite the gas 206. If an already present element inside the space 200 is used or provided as a gas excitation device 202, no additional element is needed, which can result in a cost and space saving.

In a further example embodiment, the temperature sensor is a PTC (positive temperature coefficient) sensor or a PT1000 temperature sensor. A PT1000 temperature sensor can have a temperature-dependent resistor of this kind, which has a resistance of 1000 ohms at a standard temperature, for example 0° C. Accordingly, it is additionally or alternatively also possible for PT100 or PT500 sensors to be used, the resistance of which may be 100 ohms or 500 ohms at standard temperature. That portion of the respective temperature sensor that is inside the hermetically sealed space 200 for each temperature measurement is able, as an electrical resistor, to have an electrical signal applied for heating. This allows the gas excitation device 202 to be heated using simple means. A property of the PT1000 temperature sensor is that it is made of platinum, as a result of which it has particular long term stability. This means that its electrical properties do not change, or do not change noticeably for its functionality, within an operating period, or degradation is prevented. Therefore, an additional effect of a PT1000 temperature sensor as a gas excitation device 202 is that the excitation 204 of the gas when an electrical signal is applied is stable in the long term. For the same gas 206, it is therefore still possible, even after a lengthy time, for example after one year or after ten years, for the same microphone signal 210 to be generated as, by way of example, one day after production of the hermetically sealed space 200. This means that a function test or a test on the seal of a hermetically sealed space 200 or corresponding volume 102 of this kind is also a reliable possibility for a particularly long time.

In a further example embodiment, the gas excitation device 202 comprises a photodiode. In this case, the photodiode may in particular be an infrared (IR) photodiode that is inside the volume. The photodiode can have an electrical signal applied, which can have different parameters, which means that it heats up on the basis of its electrical resistance. The photodiode can have a very low power applied to thermally excite the gas 206 in this case, which means that its functionality is not impaired and a microphone signal is caused on the basis of the thermoacoustic effect. However, the photodiode may additionally or alternatively also be used as a photodiode that emits light when the electrical signal is applied. Therefore, in one example embodiment, the gas 206 can be excited by a photodiode inside the volume, which means that a photoacoustic effect brings about the microphone signal. As a result, an additional option can be provided to test the functionality or the intact seal of the volume, which means that the certainty of the result of the evaluation can be increased. By way of example, the photodiode may be configured such that it exclusively excites the gas 206. If said gas has escaped as a result of a leak from the volume, it cannot be excited, which means that the microphone signal 210 lacks an amplitude swing. In such a case, it is possible to detect when there is no gas 206 in the space 200 and accordingly to infer a gas leak.

In a further example embodiment, an electrical signal is applied to the gas excitation device 202 to heat it, said electrical signal having a predetermined voltage and/or a predetermined frequency and/or a predetermined duty cycle. These parameters may be set such that the gas excitation device is heated by a few millikelvins, for example by 5 mK. They may also be set such that the excited gas 206 converts a power of a few milliwatts or less than one milliwatt at the microphone. The parameters can be adapted by a person skilled in the art depending on volume, microphone, gas and gas excitation device. To generate the microphone signal 210, the gas excitation device 202 can have voltage applied cyclically or periodically, for example at 10 Hz. This can heat the gas excitation device 202, for example can heat it by a few mK. Convection or thermal conduction can excite the gas 206, expand it and cause it to produce a pressure change and therefore a sound wave. This can give rise to the corresponding microphone signal at the excitation frequency.

In one example embodiment, the testing unit has a reference signal that is a microphone signal generated in a calibration situation by the gas excited by the gas excitation device of a gas-tight volume. On the basis of the reference signal, the testing unit can perform a comparison, for example, to evaluate whether a microphone signal for a volume to be tested has been generated by the same gas as the reference signal. The reference signal may thus be an expected signal that results in the event of the volume being gas-tight and filled with an expected gas. It is therefore possible to evaluate whether or not this gas is inside the volume and hence whether the volume is gas-tight or not, if there is another gas inside the volume, for example.

The testing unit can have a signal processing unit, not depicted, for the purpose of comparing the microphone signal with a reference signal. The signal processing unit can comprise a subtractor or a correlator or a divider, which is configured to use a subtraction or correlation or division to output a measure of comparison between the microphone signal and the reference signal. By way of example, a divider can output an amplitude ratio for the two signals as a measure of comparison. One output may be, by way of example, that an amplitude or a maximum of an amplitude of the microphone signal is the same as the amplitude or the maximum of the amplitude of the reference signal or differs therefrom by 1%, 5% or another percentage, for example. A subtractor can deduct respective amplitude values from one another, for example, and use a corresponding subtraction result to output the difference between the two amplitudes. The testing unit can therefore test whether or by how much the microphone signal differs from the reference signal. This allows the microphone signal for a gas-filled volume to be evaluated or assessed. The evaluation can permit conclusions about the gas with which the volume is filled and hence about the gas-tightness of the volume.

Figure 3:
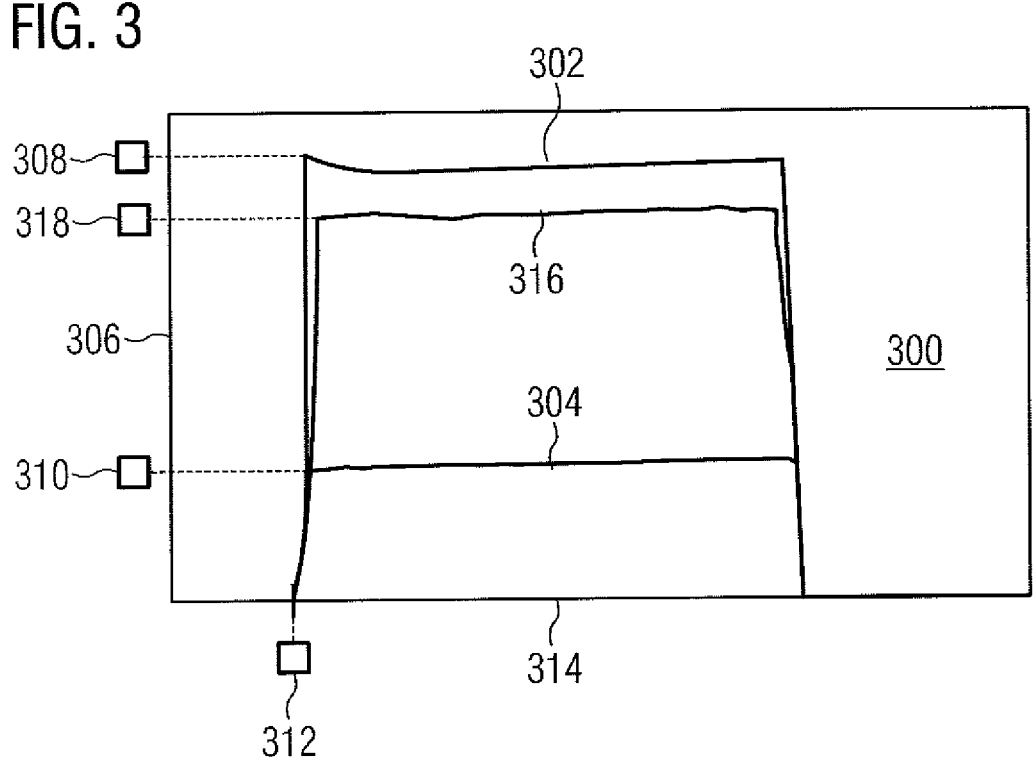
FIG. 3 shows an example of a microphone signal for a system having a gas-tight volume and of a microphone signal for a system having a leaky volume.

FIG. 3 shows an example of a measurement 300 of a microphone signal 302 for a volume with an intact seal, i.e. in this case an exchange of gas between the gas and the surroundings of the volume is prevented, and of a microphone signal 304 for a volume with a defective seal, i.e. an exchange of gas is possible in this case. An amplitude 306 of the microphone signal 302 may be a first amplitude 308 in this case, and the microphone signal 304 may be a second amplitude 310. A microphone signal 316 can additionally have an amplitude 318. A respective measurement may have been taken at a time 312 and for a period 314 in this case.

In one example embodiment, a reference signal that can be used for the comparison by the testing unit is a microphone signal generated in a predetermined calibration situation by the gas excited by a gas excitation device of an intact volume. A microphone signal of this kind is the microphone signal 302, for example. In the example embodiment, the microphone signal 302 is thus the reference signal or the microphone signal 302 is used as a reference signal. The reference signal has the amplitude 308.

A predetermined calibration situation can comprise a particular ambient temperature or standard temperature prevailing when the reference signal is measured. Further, the calibration situation can comprise a volume on which the measurement has been performed having been filled or being filled with a predetermined gas. Therefore, the type of gas with which the reference signal is associated is known. It is possible for the reference signal to be temperature dependent and for multiple reference signals to be generated for a predetermined gas at different temperatures in each case. By way of example, a reference signal may be valid for a predetermined temperature range, for example in a range of 2° K or 5° K around a respective temperature value. A system having a temperature sensor or information about the temperature can take this temperature as a basis for selecting a reference signal valid for this temperature for the comparison. The reference signal can be measured by virtue of an applicable electrical signal being applied to the gas excitation device 104 of the volume 102 in the calibration situation. As a result of the reference signal, that microphone signal that is present at the microphone output for a measurement on the volume 102 is then known if the volume 102, which is in particular gas-tight and intact, is filled with the same gas as that with which it is or was filled in the calibration situation.

The microphone signal 302, which can be used as a reference signal, may have been generated by an intact volume. The volume may in particular have its seal intact. This means that it is ensured that the predetermined gas for the calibration situation is actually in the volume. A reference signal may have been determined therefor on the basis of a measurement series using multiple volumes. The intact volumes of the measurement series can be detected statistically, for example. In one measurement series, the microphone signal 302 for an intact volume can occur more frequently than the microphone signal 304 for a defective volume, since the microphone signals 302 for intact volumes are the same while microphone signals 304 for defective volumes have different amplitudes, for example. The intactness of the volumes can also be detected by virtue of the microphone signal 302 remaining constant for multiple measurements on the same volume when a gas or ambient gas surrounding the volume is replaced by a gas of a different type during the respective measurements. The ascertainment of the reference signal by measurement can cause the reference signal for a respective gas to be able to be ascertained easily and to have to be ascertained only once. A reference signal can also be generated by a volume that is in surroundings having a predetermined gas for which the reference signal is meant to be valid, which means that the predetermined gas is inside the volume both in the event of an intact volume and in the event of a defective volume.

In one example, the reference signal may also be a theoretically ascertained or calculated microphone signal 302. Knowledge of a magnitude of the volume 102, of the gas composition, of the temperature increase in the gas 110 as a result of the gas excitation device 104 and of the sensitivity of the microphone 106 allows the amplitude 308 that would result for a measurement for an intact volume, for example, to be calculated. Calculation of one or more reference signals for one or more different gases may be possible quickly and inexpensively.

In one example embodiment, a reference signal for a particular volume can be determined once and then used as a reference signal for volumes of the same design, in particular in regard to magnitude and a gas filling. For a production run of volumes, it would then not be necessary to ascertain a separate reference signal for every single volume, but rather a reference signal would need to be ascertained only once and can be used for all volumes of the same design or of the same type. This can result in a cost and time saving for large numbers of volumes. A reference signal of this kind may have been provided in a memory of the testing unit 108 for example. Therefore, a testing unit 108 can use multiple reference signals to test the gas-tightness of different volumes.

In one example embodiment, a second reference signal may have been stored for detecting a defect or a defective seal. The second reference signal may be associated with the ambient gas 116. The microphone signal can be compared both with the first and with the second reference signal by the testing unit. If the microphone signal is the same as the second reference signal, it is known that the ambient gas 116 has entered the volume, which means that a defective seal can be inferred.

In a further example embodiment, the system 100 comprises an output unit. The output unit may be configured to output a signal with a piece of information indicating that the volume is intact. A signal of this kind may be a digital or analog electronic signal. It may therefore be known or revealed to a further piece of equipment whether the volume is intact and consequently also whether measurement results ascertained by a sensor having the volume, for example, are correct or trustworthy. Therefore, the functionality of a photoacoustic sensor can be indicated using a gas-filled volume, for example. This can also comprise the functionality of the microphone and of evaluation electronics, because if a microphone signal that is to be expected is received after the gas is excited, there is the assurance that not only the sensor cell is intact but also a signal processing used for signal generation is functional. This functionality test can be performed continuously or at predetermined intervals both during production for quality assurance purposes and during use of a photoacoustic sensor of this kind for quality monitoring purposes, without additional elements under test being needed in the sensor.

In one example embodiment, a signal of this kind is output when the microphone signal is within a predetermined tolerance range around the reference signal. The tolerance range can take into consideration ageing phenomena to be expected for the volume, for example, which mean that the microphone signal can differ slightly from the reference signal even though the volume is intact. By way of example, the reference signal used is the microphone signal 302. Excitation of the gas inside the volume can bring about the microphone signal 316. To generate the microphone signal 316, the gas excitation device can be heated once voltage is applied. In order to be within the tolerance range, the microphone signal 316 can have the same or a similar amplitude 306 to the reference signal. In one example embodiment, the microphone signal 316 has the amplitude 318 and the reference signal has the amplitude 308. Depending on a chosen tolerance range, it can nevertheless be inferred that the volume is intact. The amplitudes may be the same or may be the same on a temporal average over the period 314, which means that statistical measurement errors can be compensated for. As an alternative to an amplitude, the characteristic property used for the reference signal in some examples may also be a rise time of the signal, or other signal characteristics.

In one example embodiment, a tolerance range is consistent with an amplitude range. By way of example, it may be between 90 percent and 110 percent of an amplitude value of the reference signal. If the reference signal has the amplitude 308 and the amplitude 318 of the microphone signal is less than 3 percent or 10 percent smaller than the amplitude 308 of the reference signal, it is thus possible for a signal to be output indicating that the volume is intact. It is also possible for a signal to be output that indicates the difference in the amplitude 318 as compared with the amplitude 308, or a signal that distinguishes whether the amplitude 318 is close to, for example with a difference of 2 percent, or further away from, for example with a difference of 10 percent, the amplitude 308 within the tolerance range. A change in the difference over time, for example for two measurements performed at an interval of one day, one week or one month, can therefore be detected even though the amplitude values are each within the tolerance range. In the event of a constant change detected in this manner, it is possible to forecast a time from which the amplitude range is no longer in the tolerance range, for example.

In a further example embodiment, the testing unit comprises an output unit that can output a signal with the information indicating that the volume is defective. A signal of this kind can be output when the microphone signal is within a predetermined error range excluding the reference signal, for example. The error range can exclude the tolerance range in this case. Thus, when the microphone signal is received and the testing unit detects that it is not in the tolerance range, a piece of information can be output indicating that the volume is defective. In this case, the output unit may know that the volume is not functional and therefore measurement results from a photoacoustic sensor having this volume, for example, are not trustworthy. This information can be used to terminate or stop operation of an affected sensor, for example, or an applicable sensor can be replaced.

In one example embodiment, a signal indicating that the volume is leaky can be output if a change in the amplitude of the microphone signal 112 over time is greater than a predetermined limit value or error value. This may be 1 percent per hour, for example, or may be a value to be ascertained depending on volume. As such, it is also possible for slight damage to the seal of the volume to be detected that results in an exchange of gas with the surroundings taking place over a lengthy period. For a first measurement, the amplitude 318 of the microphone signal 316 may differ from the amplitude 308 of the reference signal by 1 percent, for example, and for a second measurement at a time interval of one hour or one day, the amplitude 318 of the microphone signal 316 may differ from the amplitude 308 of the reference signal by 5 percent, for example. In this case, it is possible for the signal indicating that the volume is leaky to be output, since the amplitude value of the microphone signal changes so quickly over time that it exceeds the error value. A leak from or defective seal of the volume can be noticed in good time as a result, in particular even if an amplitude of the microphone signal is still in a tolerance range despite a defective seal.

In a further example embodiment, the system comprises an output unit configured to output a signal with a piece of information indicating that the microphone or at least a portion of a microphone signal processing unit of the system is defective. This signal can be output when the microphone signal has an amplitude of zero or said amplitude is in a zero range, even when the gas is excited by the gas excitation device. The zero range may be an amplitude range that is less than 10 percent or less than 5 percent of the amplitude of a reference signal, for example, or a range that comprises a noise amplitude of the microphone output. Part of the system can therefore be tested for functionality in a specific manner.

In a further example embodiment, the testing unit comprises the signal output 114, which is configured to output a signal to excite the gas by means of the gas excitation device. A signal of this kind may be a binary signal or an electrical signal at a predetermined frequency, for example 10 Hz or 100 Hz, or a frequency matched to the testing unit. The signal can have a predetermined voltage, which means that it causes a current in a range of a few microamps or milliamps in the gas excitation device. The voltage may be dependent on an electrical resistance of the gas excitation device. The signal output 114 may be electrically connected to the gas excitation device. The signal output can also send an activation signal to an apparatus that again takes the activation signal as a basis for applying an applicable signal to the gas excitation device. A signal that can be applied to the gas excitation device can have a voltage according to the nature of the gas excitation device, which means that a power or heat output of a few milliwatts, for example 2 mW or 5 mW or 10 mW, can be reached at the gas excitation device. The signal can have an AC component, for example a duty cycle of 50 percent at a frequency of 10 Hz. A microphone signal generated thereby can be filtered using a lock-in. The testing unit can initiate or perform an evaluation process at any time independently of an external device as a result. The functionality or gas-tightness of the volume can thus be tested by the testing unit of the system at any time, which means that a test of this kind does not require a further external tester. It is therefore possible for information regarding whether the system is functional to be output regularly during operation, for example.

Figure 4:
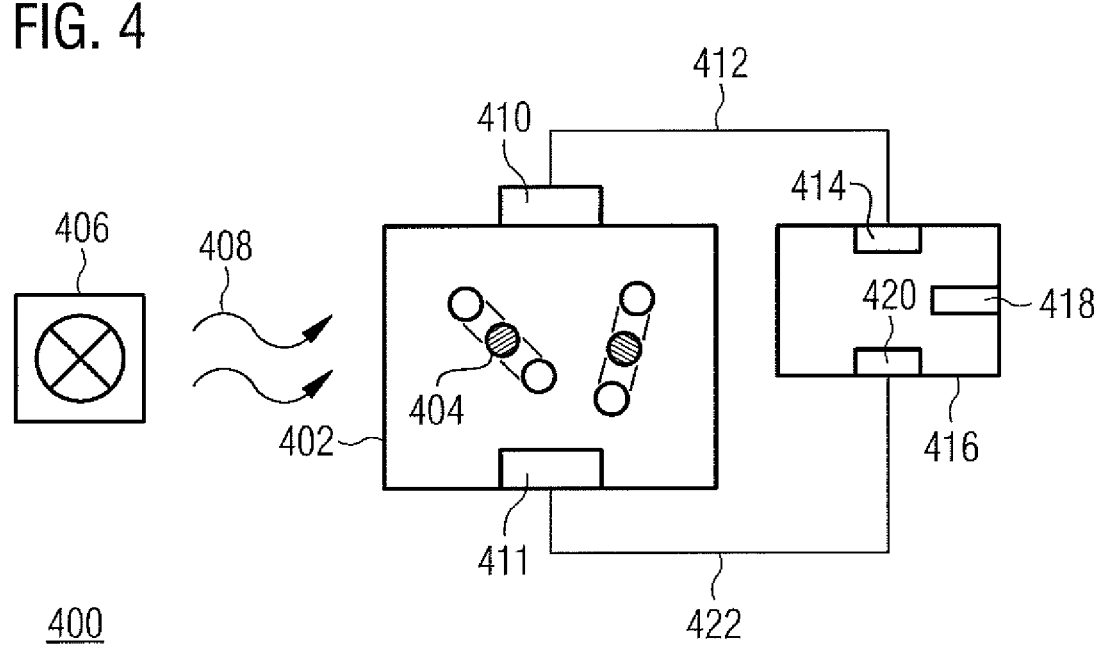
FIG. 4 shows an example embodiment of a photoacoustic sensor.

FIG. 4 shows an example embodiment of a photoacoustic sensor 400, which can also be referred to as a photoacoustic sensor system and comprises functions of the system described. The photoacoustic sensor system 400 has a hermetically sealed sensor cell 402 filled with a gas 404. It also has a light source 406 that can send a light signal 408 to the sensor cell 402. The sensor cell 402 has at least one microphone 410 and a gas excitation device 411. The gas can be photoacoustically excited by the light signal 408. The microphone is connected to a signal input 414 of a testing unit 416 via a microphone output 412. A microphone signal can be compared with a reference signal 418. A signal output 420 of the testing unit 416 is connected to the gas excitation device 411 via an electrical connection 422.

The sensor cell is of gas-tight design in line with a volume or hermetically sealed space as described previously. The light source 406, for example an optical emitter, is configured to excite the gas inside the sensor cell 402. On the basis of the optical or photonic excitation, a photoacoustic effect can be generated that gives rise to a microphone signal at the microphone that can determine a gas concentration on a measurement section via which the light signal 408 is sent.

The testing unit 416 of the photoacoustic sensor 400 is configured to test a gas-tightness of the sensor cell 402 and hence whether a gas concentration determined as described above has been determined correctly on a measurement section. To this end, the testing unit 416 can take a microphone signal as a basis for testing a gas-tightness of the sensor cell 402, the gas being thermally excited by the gas excitation device 411 and the microphone signal being generated on the basis of the thermoacoustic effect. Therefore, the proper functionality of the photoacoustic sensor system 400 can be tested. This makes it possible to ensure that, in the event of an output signal with the information indicating that the sensor cell is intact, a measurement result, which can include a concentration of a gas on a measurement section of the photoacoustic sensor system, is correct or trustworthy.

The testing unit 416 of the photoacoustic sensor 400 may be integrated in the photoacoustic sensor 400 or added to an existing photoacoustic sensor as an external component. By way of example, this allows a gas-tightness of existing sensor cells of existing photoacoustic sensors to be checked by means of the testing unit.

Figure 5:
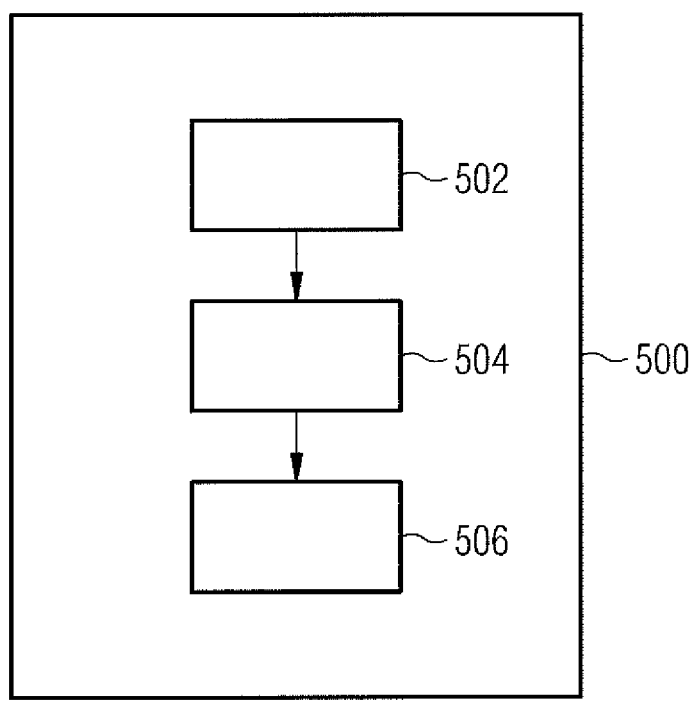
FIG. 5 shows an example embodiment of a method for testing a gas-tightness of a volume filled with a gas.

A method 500, depicted in FIG. 5, for evaluating a gas-filled volume will be described by way of example on the basis of a photoacoustic sensor system 400. The method 500 comprises exciting 502 a gas, capturing 504 a microphone signal and testing 506 a gas-tightness of the volume on the basis of the microphone signal.

According to the method, the gas is excited by means of a gas excitation device, for example by means of the gas excitation device 411. The excitation can comprise applying an electrical signal to the gas excitation device via a signal output 420 of the testing unit 416. The gas excitation device can also be activated in a different way. The gas excitation device can be heated and the gas can be excited as a result of the heating, which means that a microphone signal can be generated on the basis of a thermoacoustic effect. This microphone signal can be captured by the microphone 410 during the capture 504 and routed to the signal input 414 via the microphone output 412 and compared with the reference signal 418 by the testing unit 416. The reference signal can be provided for comparison with the microphone signal. The reference signal used can be a previously recorded microphone signal corresponding to the sensor cell 402 used and to the gas 404, for example the microphone signal 302.

The method 500 can be used on existing sensor cells or volumes or performed using sensor cells or volumes of this kind, without the need to modify them. Existing sensor cells or volumes may already have a device usable as a gas excitation device, for example in the form of a temperature sensor. By applying an applicable signal in a calibration situation, the existing sensor cell can be used to generate and store a reference signal. The reference signal can be used to compare microphone signals from the sensor cell if said sensor cell is intended to be tested for functionality or an intact seal. In this manner, the method 500 is a way of evaluating a sensor cell with little sophistication, said method being usable for sensor cells of different type or package and of different materials or sizes. The method 500 can test sensor cells and arbitrary volumes for an intact seal, or a leak test can be performed in which a pressure sensor or external test equipment can be dispensed with. This allows a leak test to be provided that is inexpensive and is compatible with high volumes, that is to say able to be applied to a large number of sensor cells produced.

In one example, the sensor cell 402 of the photoacoustic sensor system 400 is intact, that is to say a seal of the sensor cell is airtight, which means that no exchange between the gas and an ambient gas of the sensor cell is possible. In this case, the microphone signal may be consistent with the microphone signal 316. The result of the test 506 may be that an output unit of the testing unit 416 outputs the information indicating that the sensor cell is intact.

In another example, the sensor cell of the photoacoustic sensor system 400 is defective, that is to say that a seal of the sensor cell is defective or leaky, which means that the gas has escaped from the sensor cell into the surroundings as a result of a leak and the ambient gas is now inside the sensor cell as a result of an exchange of gas with the surroundings. In this case, the microphone signal may be consistent with the microphone signal 304. The microphone signal 304 can differ from the reference signal 418 by more than 50 percent, for example, which means that it is outside a tolerance range and within an error range. The result of the test 506 may be that the output unit of the testing unit outputs the information indicating that the sensor cell is defective, in particular that the sensor cell is leaky.

The aspects and features that have been described together with one or more of the examples and figures detailed above can also be combined with one or more of the other examples in order to replace an identical feature of the other example or in order to introduce the feature into the other example additionally.

Examples can furthermore be or relate to a computer program having a program code for carrying out one or more of the methods above when the computer program is executed on a computer or processor. Steps, operations or processes of different methods described above can be carried out by programmed computers or processors. Examples can also cover program storage apparatuses, e.g. digital data storage media, which are machine-, processor- or computer-readable and code machine-executable, processor-executable or computer-executable programs of instructions. The instructions carry out some or all of the steps of the methods described above or cause them to be carried out. The program storage apparatuses can comprise or be e.g. digital memories, magnetic storage media such as, for example, magnetic disks and magnetic tapes, hard disk drives or optically readable digital data storage media. Further examples can also cover computers, processors or control units programmed to carry out the steps of the methods described above, or (field) programmable logic arrays ((F)PLAs) or (field) programmable gate arrays ((F)PGAs) programmed to carry out the steps of the methods described above.

The description and drawings present only the principles of the disclosure. Furthermore, all examples mentioned here are intended to be used expressly only for teaching purposes, in principle, in order to assist the reader in understanding the principles of the disclosure and the concepts contributed by the inventor(s) for further development of the art. All statements herein regarding principles, aspects and examples of the disclosure and also concrete examples thereof are intended to encompass the counterparts thereof.

A function block designated as "means for . . . " carrying out a specific function can relate to a circuit configured for carrying out a specific function. Consequently, a "means for something" can be implemented as a "means configured for or suitable for something" e.g. a component or a circuit configured for or suitable for the respective task.

Functions of different elements shown in the figures, including any function blocks referred to as "means", "means for providing a signal", "means for generating a signal", etc., can be implemented in the form of dedicated hardware, e.g. "a signal provider", "a signal processing unit", "a processor", "a controller" etc., and as hardware capable of executing software in conjunction with associated software. When provided by a processor, the functions can be provided by a single dedicated processor, by a single jointly used processor or by a plurality of individual processors, some or all of which can be used jointly. However, the term "processor" or "controller" is far from being limited to hardware capable exclusively of executing software, but rather can encompass digital signal processor hardware (DSP hardware), network processor, application specific integrated circuit (ASIC), field programmable logic array (FPGA=Field Programmable Gate Array), read only memory (ROM) for storing software, random access memory (RAM) and nonvolatile memory device (storage). Other hardware, conventional and/or customized, can also be included.

A block diagram can depict for example a rough circuit diagram implementing the principles of the disclosure. In a similar manner, a flow diagram, a flowchart, a state transition diagram, a pseudo-code and the like can represent various processes, operations or steps represented for example substantially in a computer-readable medium and thus carried out by a computer or processor, regardless of whether such a computer or processor is explicitly shown. Methods disclosed in the description or in the patent claims can be implemented by a component having a means for carrying out each of the respective steps of said methods.

It goes without saying that the disclosure of multiple steps, processes, operations or functions disclosed in the description or the claims should not be interpreted as being in the specific order, unless explicitly or implicitly indicated otherwise, e.g. for technical reasons. The disclosure of multiple steps or functions thus does not limit them to a specific order, unless said steps or functions are not interchangeable for technical reasons. Furthermore, in some examples, an individual step, function, process or operation can include multiple substeps, subfunctions, subprocesses or suboperations and/or be subdivided into them. Such substeps may be included and be part of the disclosure of said individual step, provided that they are not explicitly excluded.

Furthermore, the claims that follow are hereby incorporated in the detailed description, where each claim may stand alone as a separate example. While each claim may stand alone as a separate example, it should be taken into consideration that—although a dependent claim can refer in the claims to a specific combination with one or more other claims—other examples can also encompass a combination of the dependent claim with the subject matter of any other dependent or independent claim. Such combinations are explicitly proposed here, provided that no indication is given that a specific combination is not intended. Furthermore, features of a claim are also intended to be included for any other independent claim, even if this claim is not made directly dependent on the independent claim.

What is claimed is:

1. A photoacoustic sensor, comprising:
   a hermetically sealed sensor cell filled with a gas;
   a gas excitation device, inside the hermetically sealed sensor cell, comprising a photodiode to thermally excite the gas based on an electrical signal applied to the photodiode;
   a microphone to output a microphone signal that is based on the thermally excited gas; and
   a testing unit to use the microphone signal as a basis for testing a gas-tightness of the hermetically sealed sensor cell.

2. The photoacoustic sensor of claim 1, wherein the gas excitation device comprises a heating apparatus.

3. The photoacoustic sensor of claim 1, wherein the microphone signal is output on a basis of a thermoacoustic property of the thermally excited gas.

4. The photoacoustic sensor of claim 1, further comprising:
   a light source, located outside of the hermetically sealed sensor cell, to photonically excite the gas to permit a concentration of the gas in the hermetically sealed sensor cell to be determined.

5. The photoacoustic sensor of claim 4, wherein the gas excitation device comprises an electrical resistor element heatable, in order to excite the gas, based on a predetermined electrical signal.

6. The photoacoustic sensor of claim 1, wherein the electrical signal has a predetermined voltage, a predetermined frequency, and/or a predetermined duty cycle.

7. The photoacoustic sensor of claim 1, wherein the testing unit is configured to output a signal indicating that the hermetically sealed sensor cell is gas-tight based on the microphone signal being within a particular range of a reference signal.

8. The photoacoustic sensor of claim 7, wherein the particular range is consistent with an amplitude range that comprises a difference in an amplitude of the reference signal.

9. The photoacoustic sensor of claim 8, wherein the difference comprises 10% and the amplitude range comprises amplitudes between 90 percent and 110 percent of the amplitude of the reference signal.

10. The photoacoustic sensor of claim 1, wherein the testing unit is configured to output a signal indicating that the hermetically sealed sensor cell is leaky based on the microphone signal being within a particular error range.

11. The photoacoustic sensor of claim 1, wherein the testing unit is configured to output a signal indicating that the hermetically sealed sensor cell is leaky based on a change in the microphone signal over time being greater than a particular error value.

12. The photoacoustic sensor of claim 1, wherein the testing unit is configured to output a signal indicating that the microphone is defective based on the microphone signal being within a predetermined range.

13. The photoacoustic sensor of claim 1, wherein the testing unit configured to output a signal that causes the gas to be excited by the gas excitation device.

14. A method for testing a gas-tightness of a hermetically sealed sensor cell of a photoacoustic sensor filled with a gas, comprising:
   exciting the gas inside the hermetically sealed sensor cell using a gas excitation device,
      wherein the gas excitation device comprises an electrical resistor element heatable to thermally excite the gas based on a predetermined electrical signal,
      'wherein the electrical resistor element comprises at least a portion of a temperature sensor inside the hermetically sealed sensor cell, and
   wherein the temperature sensor is a positive temperature coefficient (PTC) temperature sensor or a PT1000 temperature sensor;
   capturing a microphone signal on a basis of the excited gas using a microphone; and
   testing the gas-tightness of the hermetically sealed sensor cell based on the microphone signal.
   capturing a microphone signal on a basis of the excited gas using a microphone; and testing the gas-tightness of the hermetically sealed sensor cell based on the microphone signal.

15. The method of claim 14, further comprising:
outputting a signal indicating that the hermetically sealed sensor cell is gas-tight based on the microphone signal being within a particular range of a reference signal.

16. The method of claim 14, further comprising:
outputting a signal indicating that the hermetically sealed sensor cell is leaky based on the microphone signal being within a particular error range.

17. A photoacoustic sensor, comprising:
a hermetically sealed sensor cell filled with a gas;
a gas excitation device to thermally, optically, or acoustically excite the gas,
  wherein the gas excitation device comprises a photodiode configured to optically excite the gas;
a microphone to output a microphone signal that is based on the excited gas; and
a testing unit to use the microphone signal as a basis for testing a gas-tightness of the hermetically sealed sensor cell.

18. The photoacoustic sensor of claim 17, wherein the testing unit is configured to output a signal indicating that the hermetically sealed sensor cell is gas-tight based on the microphone signal being within a particular range of a reference signal.

19. The photoacoustic sensor of claim 17, wherein the testing unit is configured to output a signal indicating that the hermetically sealed sensor cell is leaky based on the microphone signal being within a particular error range.

20. The photoacoustic sensor of claim 17, wherein the testing unit is configured to output a signal indicating that the hermetically sealed sensor cell is leaky based on a change in the microphone signal over time being greater than a particular error value.

* * * * *

UNITED STATES PATENT AND TRADEMARK OFFICE
CERTIFICATE OF CORRECTION

PATENT NO. : 10,900,932 B2
APPLICATION NO. : 16/203859
DATED : January 26, 2021
INVENTOR(S) : Eberl et al.

It is certified that error appears in the above-identified patent and that said Letters Patent is hereby corrected as shown below:

In the Claims

Column 20, Lines 66 and 67, Claim 14, delete "capturing a microphone signal on a basis of the excited gas using a microphone; and"

Column 21, Lines 1 and 2, Claim 14, delete "testing the gas-tightness of the hermetically sealed sensor cell based on the microphone signal."

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*